Patented Apr. 22, 1952

2,593,890

UNITED STATES PATENT OFFICE 2,593,890

3,3'-BIS-(1-SUBSTITUTED-2,5-DIKETO-7-METHYLPYRIMIDOPYRAZOLES)

Henry B. Kellog, Weehawken, N. J., assignor to General Aniline & Film Corporation, New York, N. Y., a corporation of Delaware No Drawing. Application August 11, 1948,
Serial No. 43,765

4 Claims. (Cl. 260—256.4)

The present invention relates to 3,3'-bis-(1-substituted - 2,5 - diketo-7-methylpyrimidopyrazoles).

It is an object of the present invention to provide 3,3' - bisymmetrical - (1 - substituted-2,5-diketo-7-methylpyrimidopyrazoles) useful as color formers in photographic film for the production of stable dye images of good tinctorial strength and color by color forming development.

Other objects will be apparent from the following specification in which the preferred details and embodiments are described.

The compounds of this invention are characterized by a structure corresponding to the following general formula:

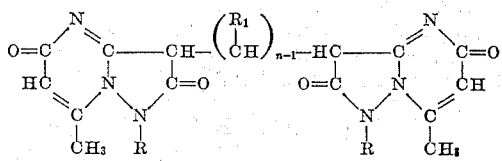

wherein R is alkyl, e. g., methyl, ethyl, propyl, butyl, octyl, decyl, dodecyl, myristyl, tetradecyl, stearyl, octadecyl, etc.; aryl, e. g., phenyl, naphthyl, diphenyl and the like; aralkyl, e. g., benzyl, methylbenzyl, ethylbenzyl and the like; heterocyclic, e. g., benzothiazolyl, α-quinolyl, α-pyridyl and the like; $R_1$ represents hydrogen, an alkyl group, e. g., methyl, ethyl, propyl, isopropyl, etc.; or a substituted or unsubstituted aryl group of the benzene and naphthalene series, e. g., phenyl, naphthyl and the like; and $n$ represents a numeral ranging from 1 to 2. Said alkyl, aryl, aralkyl and heterocyclic groups designated by the value R may be substituted by a halogen such as chlorine, bromine, or iodine, amino groups, e. g., primary amino, secondary amino, such as methylamino, phenylamino and the like, or a tertiary amino, such as dimethylamino, diphenylamino, sulfonamino, or solubilizing groups, such as sulfonic or carboxylic acid groups and the like, and aryl groups designated by $R_1$ may be substituted by a halogen as above, hydroxy, alkoxy, carboxy, or sulfo group.

The bisymmetrical compounds illustrated by the foregoing general formula are obtained by condensing a 1-substituted-2,5-diketo-7-methylpyrimidopyrazole in the presence of phenyl hydrazine or by condensing said pyrazole with an aliphatic or aromatic aldehyde in the presence of a basic condensing agent, such as, for example, piperidine.

The 1 - substituted-2,5-diketo-7-methylpyrimidopyrazoles utilized in this condensation reaction are characterized by the following general formula:

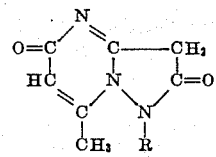

wherein R is of the same value as above.

The 1 - substituted-2,5-diketo-7-methylpyrimidopyrazoles characterized by the foregoing formula are prepared according to the method described in application Serial No. 563,974, filed on November 17, 1944, now United States Patent 2,481,466, issued September 6, 1949. In general, the method consists of heating 1 mol of a 3-amino-5-pyrazolone, the 1-position of which is substituted by a radical represented by R above, with 1 to 1½ mols of diketene in the presence of a solvent-diluent, such as, for example, an aromatic hydrocarbon, or an oxygenated hydrocarbon, i. e., an ether, ketone, or alcohol, at a temperature ranging from 80° C. to 130° C. from 2 to 5 hours. Instead of employing a solvent-diluent for the reaction, the reactants may be suspended in water and the aqueous suspension heated to a temperature ranging from 80° C. to 100° C. for the same period of time.

In preparing the bisymmetrical compounds which are not bridged in the 3,3'-position by an alkylidene group, the condensation reaction is simply carried out by refluxing two molecular equivalents of the 1-substituted-2,5-diketo-7-methylpyrimidopyrazole in the presence of phenyl hydrazine. Where the 3,3'-positions of the pyrimidopyrazoles are bridged by an alkylidene group, the condensation reaction is carried out by simply heating on a steam bath two molecular equivalents of the pyrimidopyrazole with a slight excess of a molecular equivalent of an aliphatic or aromatic aldehyde in the presence of a basic condensing agent, such as, for example, piperidine.

As examples of illustrative aliphatic and aromatic aldehydes, the following may be mentioned:

Formaldehyde (37% aqueous solution)
Acetaldehyde
Propionaldehyde
Butyraldehyde
Valeraldehyde
Benzaldehyde
p-Tolualdehyde
Phenylacetaldehyde
p-Cuminaldehyde
Naphthaldehyde
2-Naphthaldehyde
o-Chlorobenzaldehyde
m-Chlorobenzaldehyde
p-Chlorobenzaldehyde
2,4-Dihydroxybenzaldehyde
2,4-Dimethoxybenzaldehyde
3,4-Dimethoxybenzaldehyde
4-Ethoxy-3-methoxybenzaldehyde
m-Hydroxybenzaldehyde
Salicylaldehyde (o-hydroxybenzaldehyde)
p-Hydroxybenzaldehyde
Vanillin
Anisaldehyde
Piperonal (3,4-methylenedioxybenzaldehyde)

The following examples illustrate the preparation of the bisymmetrical compounds of the present invention.

EXAMPLE I (3,3'-bis-(1-phenyl-2,5-diketo-7-methylpyrimidopyrazole)

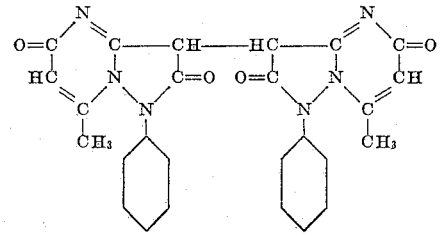

Five grams of 1-phenyl-2,5-diketo-7-methylpyrimidopyrazole were refluxed with 15 cc. of phenyl hydrazine for 2 hours. The reaction mixture was allowed to cool and the precipitated product was filtered and recrystallized from ethyl alcohol.

EXAMPLE II 3,3'-methylenebis-(1,7-dimethyl-2,5-diketopyrimidopyrazole)

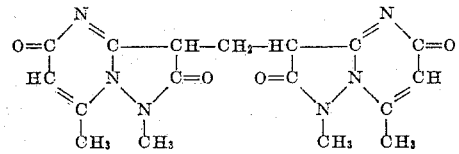

To a paste of 4.5 grams of 1,7-dimethyl-2,5-diketopyrimidopyrazole in 10 cc. of ethanol is added a solution consisting of 1.2 cc. of 37% formaldehyde and 0.5 cc. of piperidine. The mixture was warmed and stirred for 2 hours. After cooling slightly, a few cc.'s of alcohol were added followed by a few cc.'s of water. After cooling to room temperature, the solid product was filtered, washed with cold ethanol and digested with additional ethanol. When the solid became crystalline, the product was filtered hot and washed with cold ethanol and dried.

EXAMPLE III 3,3'-o-carboxy-benzylidenebis-[1-(p-tolyl) - 2,5-diketo-7-methylpyrimidopyrazole]

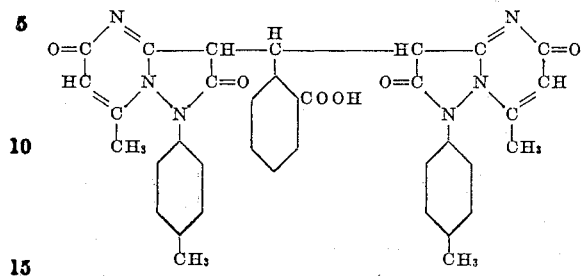

To a suspension of 10 grams of 1-(p-tolyl)-2,5-diketo-7-methylpyrimidopyrazole in 25 cc. of ethanol was added a solution of 3.5 grams of phthalaldehydic acid in 12 cc. of ethanol. The mixture was heated 20 minutes on a steam bath and precipitated by adding ether. The product was filtered and washed with ether.

EXAMPLE IV 3,3'-o-sulfo - benzylidenebis-[1-(α-quinolyl)-2,5-diketo-7-methylpyrimidopyrazole]

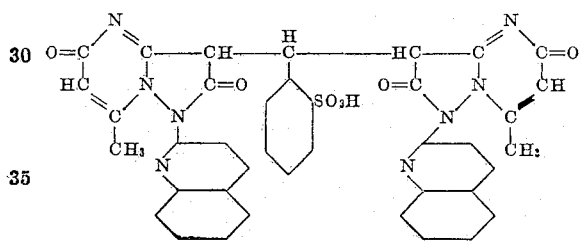

Example III was repeated with the exception that 10 grams of 1-(p-tolyl)-2,5-diketo-7-methylpyrimidopyrazole and 3.0 grams of phthalaldehydic acid were replaced by 15 grams of 1-(α-quinolyl) - 2,5 - diketo-7-methylpyrimidopyrazole and 4.5 grams of o-sulfo-benzaldehyde, respectively.

EXAMPLE V 1 gram of the product of Example I was dissolved in 20 cc. of ethyl alcohol. 2 cc. of this solution were then added to a developing solution containing an aromatic primary amino developing agent and used for the development of an exposed silver-halide emulsion. A magenta dye image of good tinctorial strength was obtained together with the silver image.

EXAMPLE VI 1.8 grams of the product of Example III were dissolved in 2.0 cc. of I-N-alcoholic KOH and added with thorough mixing to 100 cc. of a gelatin silver bromoiodide emulsion. After coating the emulsion containing the color former onto a suitable support and drying, the film was exposed and developed to yield a magenta dye image of good tinctorial strength together with the silver image.

While I have disclosed the preferred embodiments of my invention and the preferred modes of carrying the same into effect, it will be readily appreciated by those skilled in the art that many variations may be made therein without departing from the spirit thereof. Accordingly, the scope of my invention is to be limited solely to the following claims.

I claim:
1. The bisymmetrical compounds having the general formula:

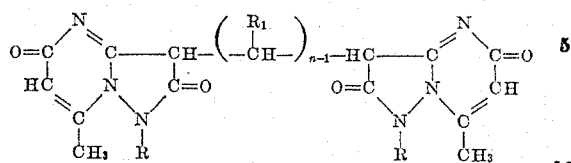

wherein R is selected from the class consisting of an alkyl radical of not more than 18 carbon atoms, mono- and bi-cyclic carbocyclic aryl groups, mono-cyclic carbocyclic aralkyl groups, and mono-nitrogenous heterocyclic groups selected from the class consisting of benzothiazolyl, alpha-quinolyl, and alpha-pyridyl, $R_1$ is selected from the class consisting of hydrogen, lower alkyl and mono- and bi-cyclic carbocyclic aryl groups, and $n$ represents a number not greater than 2.

2. The bisymmetrical compound having the formula:

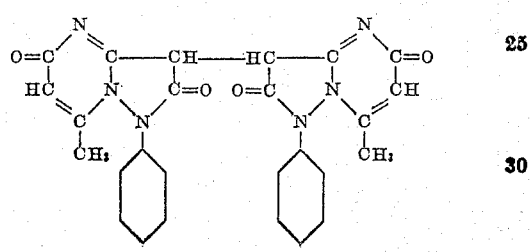

3. The bisymmetrical compound having the formula:

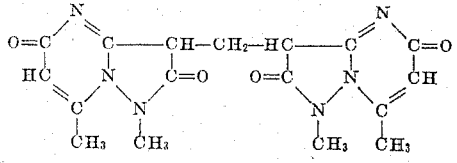

4. The bisymmetrical compound having the formula:

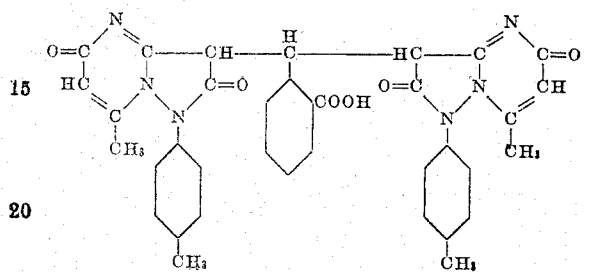

HENRY B. KELLOG.

No references cited.